Jan. 11, 1938.　　　W. C. VAN GEEL　　　2,105,303
PHOTOELECTRIC DEVICE
Filed Oct. 6, 1934
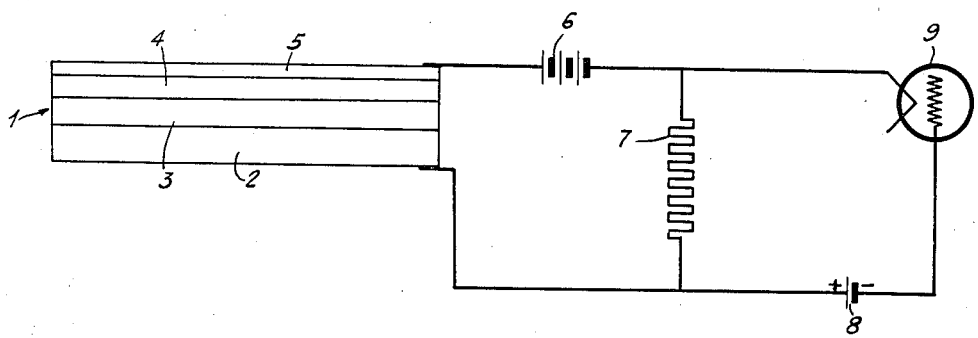
INVENTOR
WILLEM C. VAN GEEL
BY
ATTORNEY Patented Jan. 11, 1938

2,105,303

UNITED STATES PATENT OFFICE 2,105,303

PHOTOELECTRIC DEVICE

Willem Christiaan van Geel, Eindhoven, Netherlands, assignor to Radio Corporation of America, a corporation of Delaware Application October 6, 1934, Serial No. 747,252
In Germany September 25, 1933

2 Claims. (Cl. 201—63)

There are known photo-electric devices comprising an electrode of copper which is converted at its surface into cuprous oxide in such manner that at the same time a poorly conducting barrier layer is formed between the copper and the cuprous oxide. This barrier layer is consequently in genetic relation to the electrode of cuprous oxide as well as to the copper electrode. To the electrode consisting of the semi-conductive cuprous oxide, which has, as is well-known, an internal photo-electrical sensitivity, is applied a current supply member consisting of satisfactorily conductive material. The various layers are made in this case so thin that the light to which the devices are exposed can penetrate to the boundary between the cuprous oxide and the barrier layer. These rays set up in such a device an electromotive force which produces a current of electrons in an external circuit connected to the copper electrode and to the current supply member of the cuprous oxide electrode.

Besides electrodes of copper there have also been employed electrodes of other materials. It is known, for example, to constitute one of the electrodes of iron, to employ for the semi-conductor selenium, which has an internal photo-electric action, and to apply said materials on to one another so as to produce a thin barrier layer of iron selenide. The layer of selenium is made in this case so thin that the operative rays reach the boundary between the selenium and the iron selenide. In this case, too, the barrier layer is consequently formed from the iron and from the selenium so that it is in genetic relation to both electrodes.

Furthermore, it has previously been suggested to submit a disc of cuprous oxide at its surface to a treatment such that there is produced a poorly conducting barrier layer to which is subsequently applied a translucent gold film. In this case, too, there exists consequently a genetic relation between the barrier layer and the semiconductive electrode.

The resistance of the semi-conductive layer of these photo-electric devices is small relatively to that of the barrier layer, whereas the resistance of the metal electrodes is substantially equal to zero so that the internal resistance of the devices is essentially determined by the barrier layer.

The internal resistance of these known devices has been found to be small, viz., so slight that it is not quite possible to amplify the pulsatory currents produced by a varying illumination.

If a small tension is applied to the electrodes, as is often the case, an appreciable current, the so-called dark current, will be produced even without illumination of the device.

The known devices have furthermore the drawback that in many cases the formation of the barrier layer between the metal electrode and the semi-conductor is practically withdrawn from any supervision so that devices manufactured under the same conditions often show large difference.

According to the invention, an improvement is obtained by employing a barrier layer which is not in genetic relation to the photo-electric semiconductor for it has been found that if the barrier layer is made from this semi-conductor or with the aid thereof and consequently is genetically related to said semi-conductor, the internal resistance remains by far below the value which allows of obtaining a satisfactory amplification of the current variations. Besides, the manufacture is difficult to realize in such manner that the devices are exactly equal to one another.

It has been found that if the barrier layer is not formed from the semi-conductor so that it is not genetically related to the semi-conductive electrode, said layer may readily be given a thickness such that the internal resistance is increased many times and allows of obtaining a satisfactory amplification of the current variations while during manufacture a good supervision of the composition and the thickness of the barrier layer is possible so that more uniform products are obtained which show only very small differences. A further advantage obtained consists in that the capacity of the devices is considerably reduced (which is also conducive to a satisfactory amplification) and that in addition the dark current is much smaller.

In many cases the properties of the barrier layer may be acted upon still better if said layer is not in genetic relation to the metal electrode. The barrier layer is preferably made of a material adapted to spread out satisfactorily on the semi-conductor owing to which a satisfactory contact between said layer and the semi-conductive electrode is obtained.

The invention will be explained more fully with reference to the accompanying drawing.

In the drawing 1 denotes a photo-electric device according to the invention built up as follows: A brass plate 2 having, for example, a width and a length of 2 cms. and a thickness of 1 mm., carries a selenium layer 3 which may be obtained by applying to the brass plate a quantity of selenium which is then melted. The melted selenium spreads out as a thin layer on the brass plate. Dosage of the quantity of selenium allows of giving said layer the desired thickness. A suitable thickness is, for example, 100 microns. It is advantageous to heat the brass plate with the layer of selenium for some time (e. g. for half an hour to a full hour) in a furnace to about 200° C.

Subsequently a barrier layer 4 of artificial resin is formed on the layer of selenium. For this purpose there may be applied to the selenium layer a solution of a phenol- or cresol formaldehyde resin in alcohol, said resin being in condition "A". After evaporation of the solvent there occurs a heating to about 200° C. which brings about a further hardening of the resin, so that a layer of solid resin is obtained. The thickness of this barrier layer may be exactly regulated by a suitable choice of the amount of the solution applied and of the strength of said solution. A useful, high internal resistance of the device is obtained, for example, by giving the layer of resin a thickness of a few, e. g. 5 microns.

After the layer of resin has been produced a translucent gold film 5 is applied to it in any known manner. This gold film constitutes one of the electrodes and the selenium layer 3 the other while the brass plate 2 is in satisfactory contact with the selenium and constitutes the current supply member of the semi-conductive electrode 3.

With the above mentioned thickness of the barrier layer 4 the rays which have to produce the photo-electrical phenomena can readily reach, after passing through the gold film and the layer of resin, the boundary between the latter layer and the selenium electrode. It may be noted that the thicknesses of the various layers as they are shown in the drawing are very much exaggerated and do not correspond to the real thicknesses.

The electrodes of the photo-electric device have connected to them an external circuit comprising a source 6 of direct current and a high resistance 7. The source of voltage is connected in such manner that the gold electrode 5 is connected to the positive and the current supply member 2 of the selenium electrode 3 to the negative terminal of the source of current. The ends of the resistance 7 are connected, with the interposition of an accumulator 8, in a known manner to the cathode and the grid of an amplifying tube 9.

The resistance 7 must be a high one. In order to ensure a satisfactory amplification, the internal resistance of the photo-electric device should preferably be substantially equal to the resistance 7. If the barrier layer is given a sufficient thickness, said internal resistance acquires the required high value. With the above-described there was measured an internal resistance of from $10^5$ to $10^6$ ohms in the case of a thickness of the layer of artificial resin of 1 to 10 microns.

This resistance was measured as follows: A continuous voltage was applied to the electrodes the selenium layer becoming negative, the gold electrode positive and the current intensity was determined. From the ratio between the current and the voltage one calculated the resistance. The value given above has been determined with a photo-electric device arranged in the dark. It has been found that the resistance measured with daylight was a few times smaller than the value given above.

Then the resistance 7 was also given a value of $10^5$ to $10^6$ ohms. With an illumination of the gold electrode with 1 lumen and with a voltage of the battery 6 of 50 volts increases of voltage ranging from 1 to 10 volts (dependent on the value of the resistance 7 which was $10^5$–$10^6$ ohms) were measured across the ends of the resistance 7.

It has been found that the current variations produced due to a varying intensity of the illumination could be amplified very well with the aid of the above-described circuit arrangement.

If the barrier layer is not made of artificial resin but of polystyrol which is soluble in carbon tetrachloride, no subsequent heating, after evaporation of the solvent, is necessary as is the case with artificial resins.

Polystyrol and artificial resin possess the agreeable property of spreading out satisfactorily on the selenium and of depositing during the evaporation of the solvent in form of a coherent uniform layer.

The photo-electric device may also be built up as follows: An aluminium plate having, for example, a width and a length of 2 cms., and a thickness of 1 mm. and furnished with a current supply wire, is anodically oxidized at its surface in a bath of oxalic acid of 4% with a current intensity of 1 amp. per $dm^2$. The thickness of the oxide layer formed depends on the duration of the oxidation. Thus it is possible to regulate the thickness of said layer very exactly and in a reproducible manner. In a determined case the alumina layer, which is intended to form the barrier layer of the device, was given thickness of 5 microns. To said oxide layer is applied by volatilization a thin transparent selenium layer which is coated again by volatilization with a transparent gold film.

In this device the aluminum plate and the selenium layer constitute the two electrodes, the film of alumina is the barrier layer and the gold layer constitutes the current supply layer of the selenium electrode. The gold layer and the selenium electrode are so thin that the operative rays can penetrate up to the alumina.

The internal resistance of this device has been found to amount to $10^6$ ohms. It has been found that with an illumination of the gold layer by 1 lumen, with a voltage of the battery of 15 volts and with an external resistance of $10^6$ ohms, the circuit was traversed by a current of 11.5 microamperes so that across the ends of the external resistance there was a voltage of 11.5 volts.

Alternatively one may start with a copper layer which is iodized at its surface owing to which there is formed a layer of copper iodide which is a photo-electrically semi-conductive material. To said copper iodide layer is subsequently applied a translucent barrier layer, for example of artificial resin, which is coated with a transparent gold layer.

The device may also be manufactured in the following manner: On to a brass plate is applied a selenium layer on which is formed by vaporization and condensation of calcium fluoride a thin calcium fluoride layer having a thickness, for example, of 1 micron which is coated again with a transparent layer of gold or cadmium.

As semi-conductors having an internal photo-electrical action may be employed, besides selenium and copper iodide, also other materials, for example cuprous oxide ($Cu_2O$), molybdenum sulphide ($MoS_2$). For the barrier layer enter also into consideration, for example, materials such as paraffin, stearin or paper. When paper is employed it is applied preferably with the interposition of a material liable to spread out satisfactorily on the semi-conductor, e. g. an artificial resin, on the semi-conductive electrode.

The metal electrode may be replaced by an electrode of carbon which also has a metallic conductivity.

What I claim is:—

1. A photo-conductive cell comprising a metallic conductive base, a light-responsive semi-conductive layer thereon, a transparent second conductive layer, and a barrier layer of artificial resin separating the light-responsive layer and the second conductive layer, the said barrier layer having a thickness of not over 10 microns and a resistance of at least 100,000 ohms.

2. A photo-electric device comprising a conductive layer, a light-responsive semi-conductive layer thereon, a second conductive layer, and a barrier layer of artificial resin separating the light-responsive layer and the second conductive layer, at least one of the conductive layers being substantially transparent, and the said barrier layer having a thickness of not more than 10 microns and a resistance of not less than 100,000 ohms.

WILLEM CHRISTIAAN van GEEL.